(12) United States Patent
Prakash et al.

(10) Patent No.: US 7,059,201 B2
(45) Date of Patent: Jun. 13, 2006

(54) USE OF MULTI-LAYER THIN FILMS AS STRESS SENSORS

(75) Inventors: Shiva Prakash, Santa Barbara, CA (US); Srinivasan K. Ganapathi, Fremont, CA (US); Randolph S. Gluck, San Jose, CA (US); Steven H. Hovey, Goleta, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 263 days.

(21) Appl. No.: 09/747,304

(22) Filed: Dec. 20, 2000

(65) Prior Publication Data

US 2002/0073785 A1    Jun. 20, 2002

(51) Int. Cl.
    *G01D 7/00*    (2006.01)
(52) U.S. Cl. ................................. 73/862.041
(58) Field of Classification Search ............ 73/779, 73/105; 360/113, 324.11; 428/668, 611; 333/35

See application file for complete search history.

(56) References Cited

U.S. PATENT DOCUMENTS

| | | | |
|---|---|---|---|
| 4,394,773 A | | 7/1983 | Ruell ............................. 382/4 |
| 4,499,515 A | * | 2/1985 | Pitrowski et al. ........... 360/113 |
| 5,408,377 A | * | 4/1995 | Gurney et al. .............. 360/113 |
| 5,442,508 A | * | 8/1995 | Smith .......................... 360/113 |
| 5,491,600 A | * | 2/1996 | Chen et al. .................. 360/113 |
| 5,856,617 A | * | 1/1999 | Gurney et al. ................. 73/105 |
| 5,891,586 A | * | 4/1999 | Hasegawa et al. ........... 428/668 |
| 6,177,204 B1 | * | 1/2001 | Chen et al. .................. 428/611 |
| 6,381,171 B1 | * | 4/2002 | Inomata et al. ............. 365/173 |
| 6,414,564 B1 | * | 7/2002 | Mizoguchi et al. ............ 333/35 |
| 6,473,279 B1 | | 10/2002 | Smith et al. ........... 360/324.12 |
| 6,504,688 B1 | * | 1/2003 | Hasegawa et al. ..... 360/324.11 |
| 6,538,858 B1 | | 3/2003 | Hasegawa et al. ..... 360/324.12 |

FOREIGN PATENT DOCUMENTS

EP    0 889 521    1/1999

OTHER PUBLICATIONS

Notification of Transmittal of IPER, Mar. 11, 2004, PCT/US01/50341.

* cited by examiner

*Primary Examiner*—Max Noori
*Assistant Examiner*—Octavia Davis
(74) *Attorney, Agent, or Firm*—Pillsbury Winthrop Shaw Pittman LLP

(57) ABSTRACT

The present invention provides a pressure sensing device that includes at least one TMR sensor, and preferably an array of TMR sensors, with each TMR sensor having an insulating spacer layer interposed between a pinned and a free ferromagnetic layer. In an unbiased state, the magnetization vector of each of the ferromagnetic layers is preferably parallel to each other. Upon application of a small voltage, the magnetization vectors remain unchanged. Upon application of stress, the magnetization vector of the free magnetic layer will rotate, thus causing a corresponding and proportionally related change in the resistance of the sensor. This change in resistance can be sensed and used to calculate the stress applied thereto.

85 Claims, 10 Drawing Sheets

| | |
|---|---|
| Capping layer | 460 |
| Antiferromagnet layer | 450 |
| Ferromagnet layer | 440-5 |
| Ferromagnet layer | 440-4 |
| Spacer | 440-3 |
| Ferromagnet layer | 440-2 |
| Ferromagnet layer | 440-1 |
| Barrier layer | 430 |
| Ferromagnet layer | 420-5 |
| Ferromagnet layer | 420-4 |
| Spacer | 420-3 |
| Ferromagnet layer | 420-2 |
| Ferromagnet layer | 420-1 |
| Underlayer | 410 |

FIG. 4

USE OF MULTI-LAYER THIN FILMS AS STRESS SENSORS

FIELD OF THE INVENTION

The present invention relates to Tunneling MagnetoResistive (TMR) devices in conjunction with micromachined beams to measure stresses with high sensitivity, and methods of making and using the same.

BACKGROUND OF THE INVENTION

Historically, fingerprint image-capture devices have used optical-based sensors or capacitance-based sensors. With reference to the specific example of a fingerprint, optical sensors use a light source, lenses and a prism to image the "ridges" and valleys on the fingerprint, based on differences in the reflected light from the features. The conventional capacitance sensor uses semiconductor type processing to fabricate a two-dimensional array of capacitors. The individual sensors form one plate of the parallel plate capacitor, while the finger itself, when placed on the array, acts as the second plate. Upon contact with the array of sensors, the individual distance from each sensor to the skin is measured using capacitive techniques. The difference in distance to skin at the ridges and valleys of a fingerprint provide the means to replicate the fingerprint. An example of the use of capacitive sensors to measure the spacing is shown in FIGS. 1A and 1B.

Both the above techniques fundamentally measure the spacing between the fingerprint features, and the sensor. The measurement of spacing is inherently subject to several distortion effects: since the height difference between the ridges and valleys is only of the order of 50 microns, any parameter which affects the spacing between the finger and the sensor will affect the measurement. For example, both types of sensors are very sensitive to the thickness of the protective coating. They are also sensitive to oils or grease on the finger, and the presence or absence of moisture on the finger. In addition, most of these sensors are adversely affected by ambient temperature at the time of sensing, as well as electrostatic discharge (ESD). Under very hot or very cold conditions, the capacitive sensor can provide erroneous readings. ESD can altogether destroy a sensor. The combined effect of all these variables results in a very distorted image, if any, of the fingerprint, as shown in FIG. 1C.

As a result of the above drawbacks to spacing based reproduction of fingerprints, it would be very useful to be able to use the difference in pressure exerted by the ridges and valleys of a fingerprint on a sensor to replicate the fingerprint image. In principle, a pressure-based fingerprint sensor would be impervious to the drawbacks listed above, such as wet or dry conditions on the fingertip, presence of oil or grease on the fingertip, thickness of protective coatings, etc., providing a "digital" response, depending on whether the sensor experiences a ridge or not. This situation is illustrated in FIGS. 1D and 1E, where the pressure sensor can highlight only the ridges, which are the lines of interest in a fingerprint. However, due to a variety of factors, including the very low sensitivity and inability to provide the required resolution, pressure based sensors have not been deployed for the replication of fingerprints.

Improvements in pressure sensors are described in U.S. patent application Ser. No. 09/500,706 entitled "Magnetoresistive Semiconductor Pressure Sensor and Fingerprint/Verification Sensors Using the Same" and U.S. patent application Ser. No. 09/502,406 entitled "Use of Multi-Layer Thin Films as Stress Sensors, Appln., both assigned to the same assignee as the present invention. These applications describe many different improved aspects of pressure sensors, including sensors based upon magnetostriction and the GMR effect.

While the above applications provide many advantages, improvements that can result in greater sensitivity, less power consumption and lower thermal build-up are nonetheless desirable.

The present invention, as described below, described such a device, which, as one of it aspects, operates using the Tunneling MagnetoResistive (TMR) effect. The TMR effect was discovered relatively recently in the mid 1980's by Julliere et al. Since then researchers in the area of random access and flash semiconductor memories have explored the TMR principle to enhance the utility of such devices. This research, however, has been limited to these areas, and has not been reported as having usefulness in the context of fingerprint and pressure sensing applications.

SUMMARY OF THE INVENTION

It is an object of the present invention to provide a TMR sensor for the detection of pressure or stress.

It is an object of the present invention to provide a TMR sensor that includes two ferromagnetic layers separated by an electron-tunneling barrier, with electrical Current flowing Perpendicular to the Plane of the layers (CPP).

It is another object of the current invention to magnetically pin one ferromagnetic layer while allowing the other ferromagnetic layer to rotate freely under the action of an externally applied stress.

It is another object of the current invention to reduce the magnetic moment of the free ferromagnetic layer by forming a composite trilayer stack containing a ferromagnetic layer, a spacer layer, and another antiferromagnetically-coupled ferromagnetic layer, referred to together as the synthetic free layer (SyFL).

It is another object of the current invention to reduce the magnetic moment of the pinned ferromagnetic layer by forming a composite trilayer stack containing a ferromagnetic layer, a spacer layer, and another antiferromagnetically-coupled ferromagnetic layer, referred to together as the synthetic pinned layer (SyPL).

It is a further object of the present invention to provide a TMR sensor capable of sensing both compressive stress and tension.

It a further object of the present invention is to provide a TMR sensor that is protected from Electro-Static Discharge (ESD).

It is a further object of the present invention to provide a TMR sensor that can be adapted to have substantial independence from temperature shifts.

Another object of the invention is to provide a TMR sensor that is suitable for use in fingerprint identification and verification.

Another object of the invention is to provide a TMR sensor that is suitable for use in fingerprint identification and verification and that is less sensitive to adverse conditions such as extreme temperatures and skin oils and grease.

The present invention fulfills these and other objects of the present invention, by providing a pressure sensing device that includes at least one lithographically patterned TMR sensor, but preferably an array of TMR sensors, with each TMR sensor having an insulating spacer layer interposed between a free and a pinned ferromagnetic layer. In an unbiased state, the magnetization vectors of the ferromagnetic layers are preferably parallel to each other, but can also be antiparallel to each other and still remain stable with respect to each other. Upon application of a small voltage, the magnetization vectors remain unchanged. Upon application of stress, the magnetization vector of the free layer will rotate away from parallelism with the pinned layer, thus causing a corresponding and proportionally related change in the resistance of the magnetic material of the sensor. This change in resistance can be sensed and used to calculate the stress applied thereto.

While the above provides an overview of the invention, there exist numerous other significant aspects and advantages that will become apparent in the discussion provided hereinafter. In this regard, for instance, reference to a free layer magnetization can interchangeably reference the net moment of a synthetic free layer stack. The same holds for the pinned layer, which can just as well be replaced with a synthetic pinned layer stack.

BRIEF DESCRIPTION OF THE DRAWINGS

The above and other objectives, features, and advantages of the present invention are further described in the detailed description which follows, with reference to the drawings by way of non-limiting exemplary embodiments of the present invention, wherein like reference numerals represent similar parts of the present invention throughout several views and wherein:

FIG. 4 is a schematic of the cross-section of a TMR sensor stack according to a preferred embodiment of the present invention.

DETAILED DESCRIPTION OF THE PREFERRED EMBODIMENTS

Figure 1A:
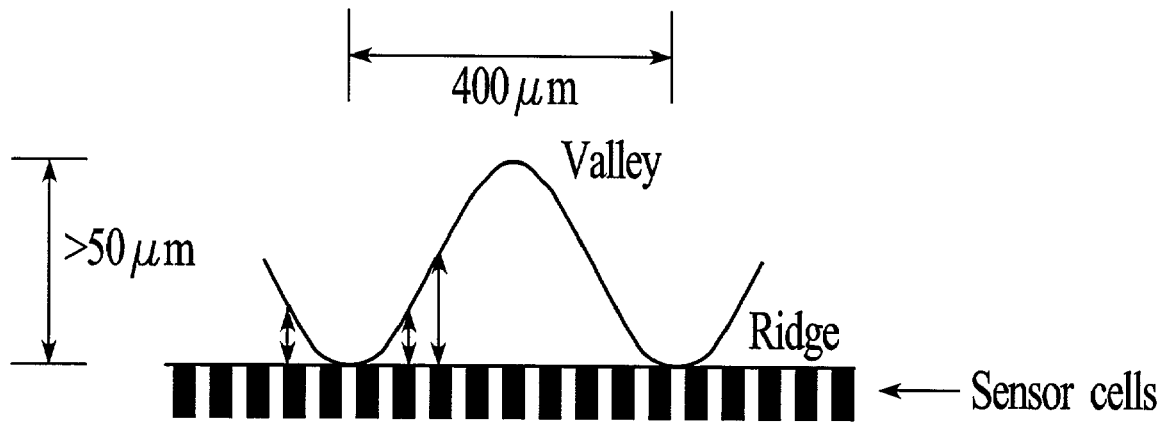
FIGS. 1A–1E are side views of a fingertip on a prior art capacitive sensor, and on a potential pressure sensor according to the present invention which illustrate the use of spacing versus pressure for replicating the fingerprint, and the distortion associated with the prior art.
Figure 1B:
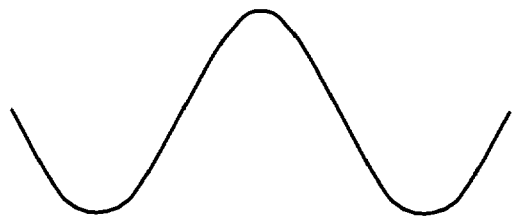
Figure 1C:
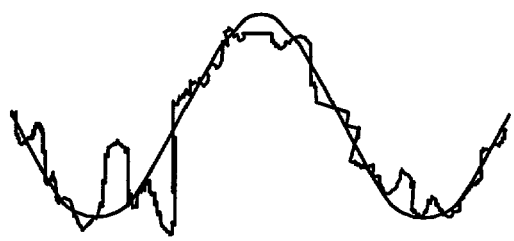
Figure 1D:
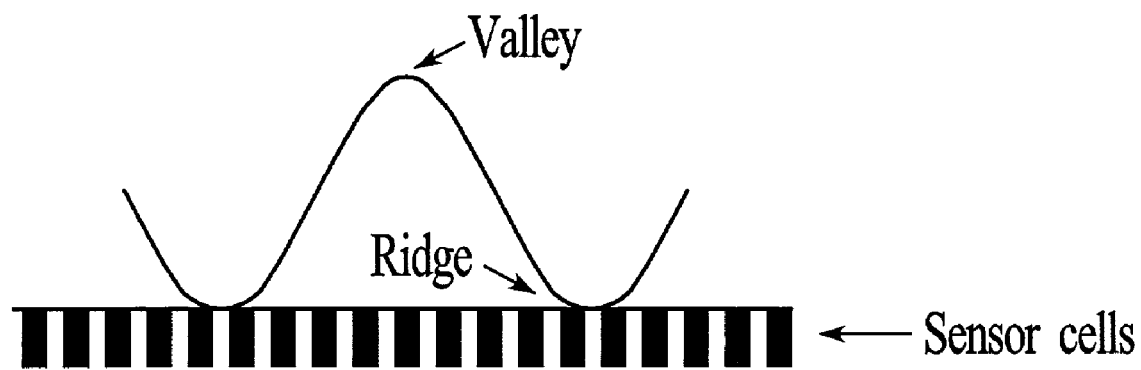
Figure 1E:

The working principle of TMR has certain similarities to that of GMR, since in both TMR sensors (as described herein) and GMR sensors, a change in applied pressure will cause a rotation of the magnetization associated with the device, and a corresponding change in resistance, which can be sensed. Further, in both devices, there is a stack of layers, in which the innermost and outermost layers are made of ferromagnetic materials. Despite those similarities, implementation of a TMR device is very different from implementation of a GMR device. In particular, this is due to the fact that the layer between the inner and outer ferromagnetic layers is an insulating, rather than a conducting material, and the electrical current flows perpendicular to the plane of the layers, rather than in the plane of the layers.

As a result of these differences, the following observations have been noted by the present inventors, which lead to the conclusion that a TMR device can have advantages to GMR device when both are used as a sensitive strain gauge.

Firstly, due to the low resistance of a GMR device, electrical currents in the milliampere range are required for generating sufficient output voltage. For example, for a typical GMR sensor with 100 ohm resistance and 5% usable GMR effect, a 2 mA current will produce a voltage output of only 10 mV, but a 4 mA current will produce a more measurable output of 20 mV. This quadruples the power requirement of the device. By comparison, a TMR device with a resistance of $10^5$ ohms and 10% usable TMR effect will produce the same output voltage of 20 mV with only 2 µA current flowing.

Secondly, the I$^2$R heating effect is relatively high for a spin valve sensor that uses the GMR effect, since it uses more current (in the mA range). In the example cited in the paragraph above, the GMR sensor will dissipate 1.6 mW, whereas the TMR sensor will dissipate 3 orders of magnitude less power. Thus, the I$^2$R heating effect is an important limitation in applications that need a dense array of sensors, such as in fingerprint sensors, and also in situations where temperature control is critical for accurate calibration and reading of strain. With the GMR sensor, the temperature of the sensor during operation is a compound effect of both ambient temperature variation and temperature rise due to this intrinsic heat dissipation. Separating these effects involve additional features that add cost, which are eliminated with TMR sensors.

Thirdly, and specifically in situations such as fingerprint sensors where large sensor arrays are used, the mA current per sensor requirement causes another undesirable side effect. This is the exceedingly high total current flowing through all the sensors in the array. For a 256×256 array, this could quite easily exceed 1 Ampere. The external circuits have to be made robust to deal with such high currents, which will again increase the total cost to the user, or make the product cost-ineffective.

Fourthly, the absolute value of the magnetoresistive effect is limited for the GMR spin valve sensor to about 15%. For a tunneling spin valve sensor, by comparison, the magnetoresistive effect can be as high as 40%. Gage factors can thus be much higher for TMR sensors, as described further hereinafter.

Figure 2:
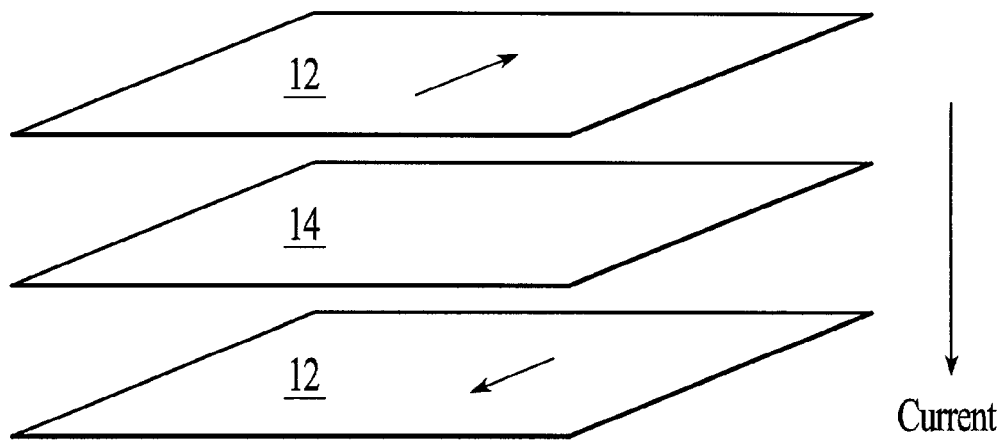
FIG. 2 is a schematic view of a conventional TMR multi-layer stack, using alternating ferromagnetic layers separated by a non-magnetic insulating spacer.
Figure 3:
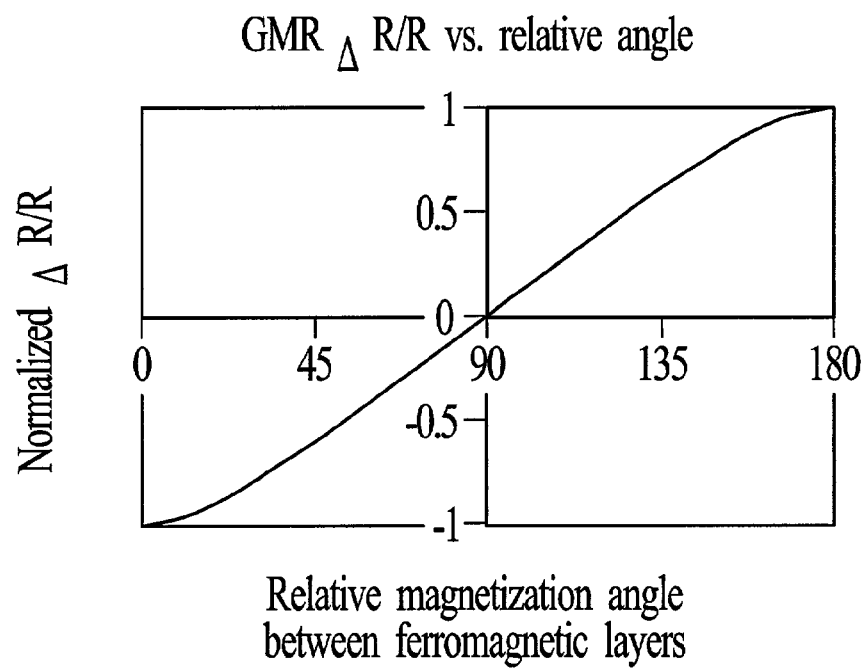
FIG. 3 is a graph illustrating the resistance response of a GMR/TMR multi-layer stack to changes in relative angle between the alternating ferromagnetic layers.

FIG. 2 shows the basic structure of a TMR device, in which there are alternating ferromagnetic layers 12, made from elements such as Cobalt, Iron or Nickel, are separated by a nonmagnetic insulator layer 14, such as aluminum oxide to form a sensor 10. When an electrical current is imposed across the thickness direction of the sensor (Current Perpendicular to Plane or CPP direction), the electrical resistance of the multi-layer stack of films varies as the relative angle between the magnetizations of the individual ferromagnetic layers, as shown in FIG. 3. The resistance is a minimum when the magnetization vectors between the neighboring ferromagnetic layers are parallel to each other, and is maximum when the two vectors are antiparallel to each other (at 180°), as shown in FIG. 2 and FIG. 3.

The change in electrical resistance of a TMR multi-layer stack for full rotation of the magnetization vector from a parallel to an antiparallel state can be anywhere from 2% to 40%, which are approximately twice that of GMR values. Accordingly, one aspect of the present invention is based upon rotating the magnetization of some layers in a TMR multi-layer stack under the application of stress in order to provide a greater sensitivity pressure sensor.

Before describing the initial preferred embodiment in detail, an overview of the concepts that are used by the present invention will be first provided. Subsequently, the preferred embodiments and alternative embodiments will be discussed.

The rotation of the magnetization vector of a soft ferromagnetic layer that comes about from the magnetoelastic driving force is proportional to the product of the stress and the magnetostriction. The sensors of the present invention based upon this concept are multi-layer thin film stacks, which are deposited onto the substrate to be monitored, and photolithographically patterned to a certain aspect ratio, defined as the length/width ratio. A uniaxial compressive or tensile stress in bending, acting upon the flexible beam substrate and therefore upon the sensor, preferably along its length, produces a rotation of the magnetization vector of the free layer or SyFL layer, even under the absence of an external magnetic field. The free layer's initial magnetic orientation prior to stress application is orthogonal to the stress direction, and preferably parallel to the magnetic orientation of the second ferromagnetic pinned layer or SyPL layer. A requirement for this magnetization rotation is the sensor's property of magnetostriction, which must be non-zero ($>+10^{-7}$ or $<-10^{-7}$), preferably $+/-10^{-5}$ and whose sign must be appropriate for the sign of the stress. The rotation of the magnetization in turn produces a change in the resistivity of the magnetic material, and, in the presence of voltage applied to the device, causes a corresponding change in the current flow.

This invention describes a preferred embodiment that uses an antiferromagnetic layer to fix the magnetizations of the pinned ferromagnetic layer. Specifically, as shown in FIG. 4, the preferred embodiment includes, in order from the substrate 400, the underlayer 410, the (synthetic) free layer 420, the insulating barrier layer 430, the (synthetic) pinned layer 440, the antiferromagnetic pinning layer 450, and the capping protective layer 460. Each ferromagnetic layer 420 and 440 can be a single or multiple layers, and each of the ferromagnetic layers 420 and 440 yield non-zero magnetostriction.

FIG. 4 illustrates an exemplary five layer synthetic ferromagnet structure composed of NiFe 420-1, CoFe 420-2, Ru 420-3, CoFe 420-4 and NiFe 420-5. Of course, the materials used in the composite can change in type, order, number and other variables to make up the synthetic free layer 420, and NiFe 440-1, CoFe 440-2, Ru 440-3, CoFe 440-4 and NiFe 440-5 make up the preferred synthetic pinned layer 440, again with the variations of the type noted above being contemplated. NiFeCo, Co or other ferromagnetic materials can also be used for the ferromagnetic layers. The thickness of each ferromagnetic layer is typically within the range of 0.1–50 nm. The antiferrogmagnetic pinning layer can be made of for example, CrMnPd. The capping layer can be made of, for example, Tantalum.

Figure 5A:
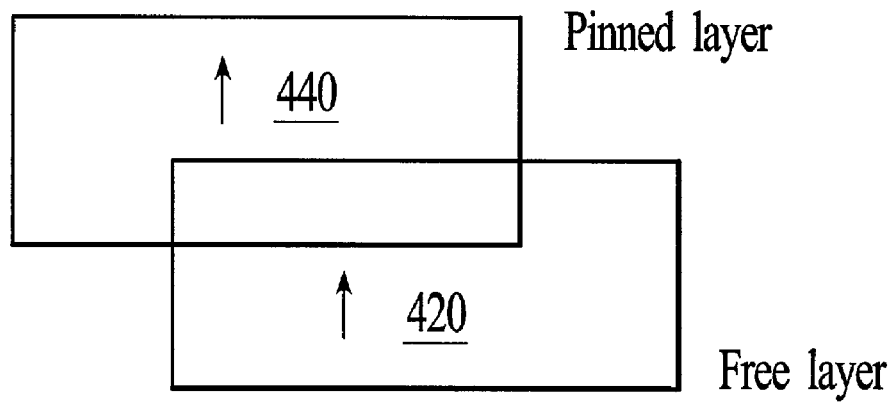
FIGS. 5A–5B show the magnetization configuration of the free and pinned layer net moments before and after the application of external uniaxial stress along the length direction. In 5A, the magnetizations are shown parallel to each other, providing low resistance to current, and in 5B, the magnetizations are shown at 90 degrees to each other, providing a higher resistance to current flow.

The barrier layer 430 provides for a small ferromagnetic coupling $H_{ilc}$ between the pinned ferromagnetic layer 440 and the free ferromagnetic layer 420, which in the case of the preferred embodiment is such that the magnetization vectors of the individual layers on either side of the barrier layer 430 are pointed in the same direction and orthogonal to the length of the sensor, as shown in FIG. 5A. Barrier layer 430 is made of a non-magnetic, electrically insulating material, such as Aluminum Oxide. In the preferred embodiment, the thickness of the barrier layer 430 is within the range of 0.1 to 10 nm.

In the quiescent, zero stress state of the device, the resistance of the sensor is preferably at the extreme value of minimum resistance (parallel net magnetization vectors for free and pinned layers, FIG. 5A) as shown in FIG. 3, left hand side of the graph. The resistance of the sensor is determined specifically by the relative angle between the magnetization vectors of the individual ferromagnetic layers 420 and 440 on either side of the barrier layer 430. Parallelism is described by a zero angle, antiparallelism by 180 degrees, etc.

Figure 5B:
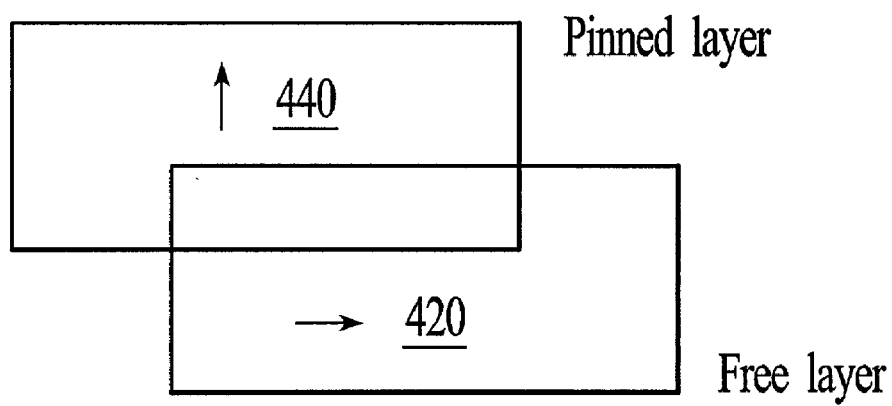

Under application of stress, for an appropriate combination of sign of magnetostriction and sign of stress along the length of the sensor, the free layer 420 will rotate towards the length direction, as shown by FIG. 5B. As it rotates, the angle between the moment (or magnetization) vectors of the free layer 420 and pinned layer 440 increases from zero, and the resistance of the device increases. One can thus use this resistance change as a measure of the stress. In the fully saturated state, the moments of the layers 420 and 440 are 90 degrees to each other, and the resistance of the sensor is at the midpoint.

That a useful resistance change can be achieved as a result of the magnetization of the sensor films can be shown with reference to an exemplary sensor having an aspect ratio of 1.5. Where:

$H_{ilc}$: the interlayer coupling field, which can be controlled to approximately 2–5 Oe, in the +y (width) direction, ferromagnetic in nature due to interfacial roughness.

$H_{k,i}$: intrinsic growth anisotropy, in the +/−y direction, induced at film growth.

$H_{d,f}$: Demagnetization field in the free layer due to charges accumulating at edges. This follows the magnetization and is kept to a minimum (designed out) by utilizing a synthetic free layer with low or no net moment.

$H_{d,p}$: Demagnetization field in the pinned layer due to charges accumulating at edges. This follows the magnetization and is kept to a minimum (designed out) by utilizing a synthetic pinned layer with low or no net moment.

$H_{k,\sigma}$: Stress-induced anisotropy in the +/−x direction, due to the application of stress.

$H_{k,eff}$: Effective $H_k$ in the applied stress (x) direction whose magnitude is equal to $H_{k,\sigma}-H_{k,i}$. i.e.

$$H_{k,eff}=H_{k,\sigma}-H_{k,i} \qquad 1$$

The output of the sensor is proportional to the average value of a cosine function <cos>, which is defined as:

$$<\cos>=(1-<\cos(\theta_p-\theta_f)>)/2 \qquad 2$$

$<\cos(\theta_p-\theta_f)>$ provides the average value of the cosine of the angle between the magnetizations of the pinned and free layers across the sensor. This varies with applied stress via the property of magnetostriction. The average cosine function can be determined as a function of $H_{k,eff}$ by deriving and solving the equations for the minimization of magnetic free energy. The useful TMR % as a function of $H_{k,eff}$ can then be obtained using the following basic relationship of TMR % to the cosine function:

$$TMR\ \%=TMR\ \%_{max}\times(<\cos>_f-<\cos>_i) \qquad 3$$

The subscripts f and i are for final and initial states, i.e. stressed and unstressed states.

Figure 6:
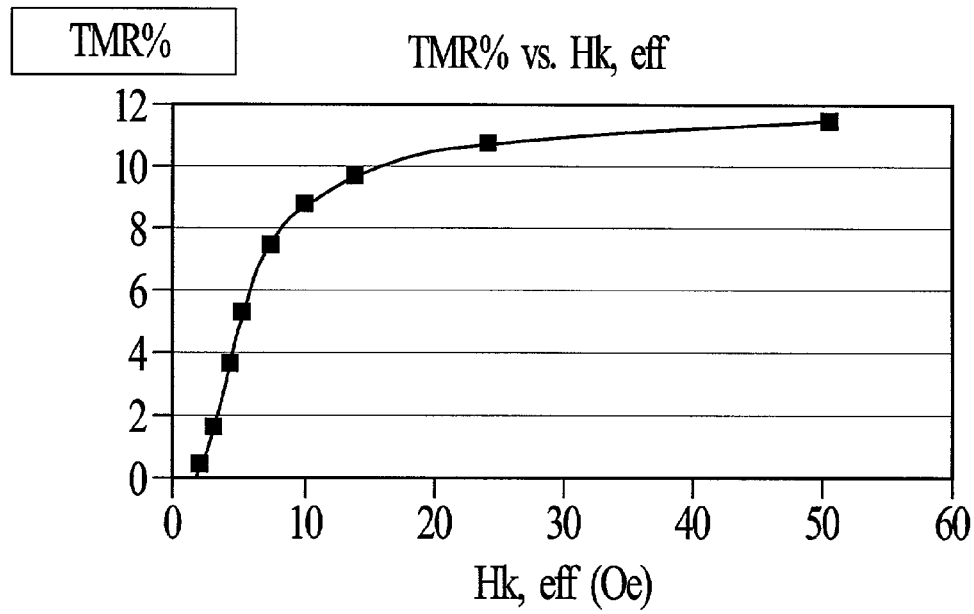
FIG. 6 shows the computation of TMR % as a function of $H_{k,eff}$ according to the present invention.

In equation 3, $<\cos>_f$ is a function of stress, or more precisely, of the effective anisotropy, $H_{k,eff}$, which is the difference between the stress-induced anisotropy and intrinsic anisotropy. The TMR % as a function of $H_{k,eff}$ is shown graphically in FIG. 6. Note the rapid increase of TMR % with small stress and the asymptotic saturation at higher values. This is a desirable property, since it provides a high sensitivity to the detection of stress, and a "digital" response. TMR $\%_{max}$ has been assumed as 25% and the maximum percent resistance change obtainable is 0.5 TMR $\%_{max}$, due to the 90 degree maximum rotation of the free layer.

The equation that describes the relationship of $H_{k,\sigma}$ to stress is:

$$H_{k,\sigma}=3\times\lambda\times\sigma/M_s \qquad 4$$

Where $\lambda$ and $\sigma$ are magnetostriction and stress, and $M_s$ is the saturation magnetization of the free layer.

Figure 7:
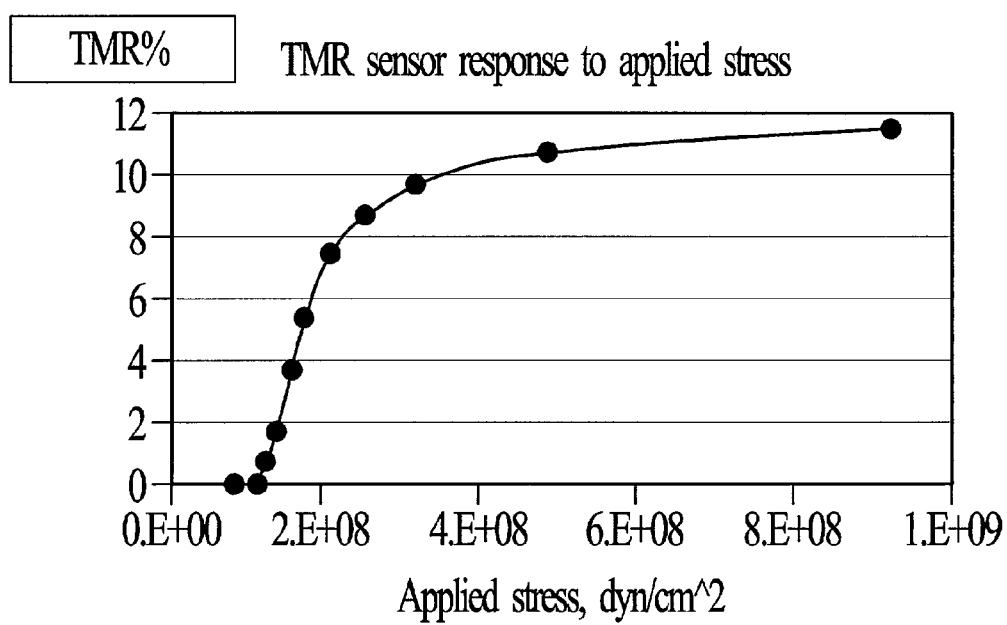
FIG. 7 shows the computation of TMR % as a function of applied stress in dynes/cm$^2$ according to the present invention.

The TMR % can be plotted as a function of stress using equation 1 and 4, to generate FIG. 7.

The rapid rise of TMR % with low stress values (low 1e8 range, in dyn/cm2) shows the sensitivity of the sensor more clearly.

Gage factor, which provides a quantitative measure of this sensitivity, is defined as: $dR/\epsilon$. It can also be written as $dR.E/\sigma$, where $\epsilon$ is the strain, E the modulus of elasticity, and dR the change in resistance as a percentage. i.e.

$$g.f.=dR.E/\sigma \qquad 5$$

Figure 8:
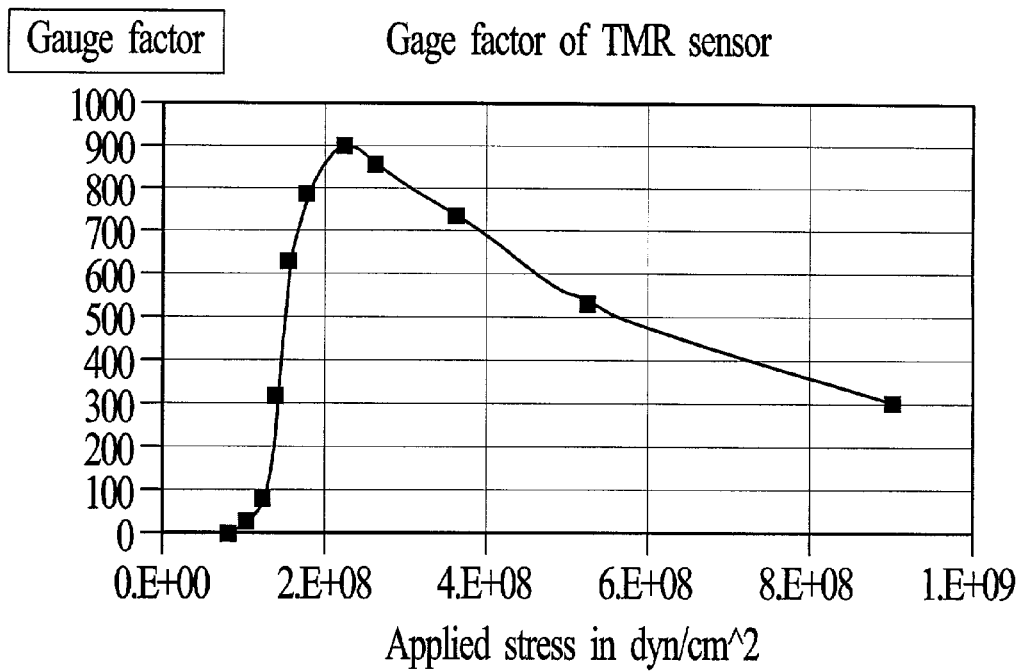
FIG. 8 shows the resulting Gauge Factor as a function of applied stress in dynes/cm$^2$ according to the present invention.

Substituting the values into equation 5, FIG. 8 can be generated, which shows the gage factor as a function of stress. The maximum gage factor occurs at very low stress values, which again confirms the high sensitivity of this sensor. Conventional sensors for pressure detection provide a maximum gage factor in the 75 to 150 range, far below the value of 900 for this TMR sensor.

Figure 9:
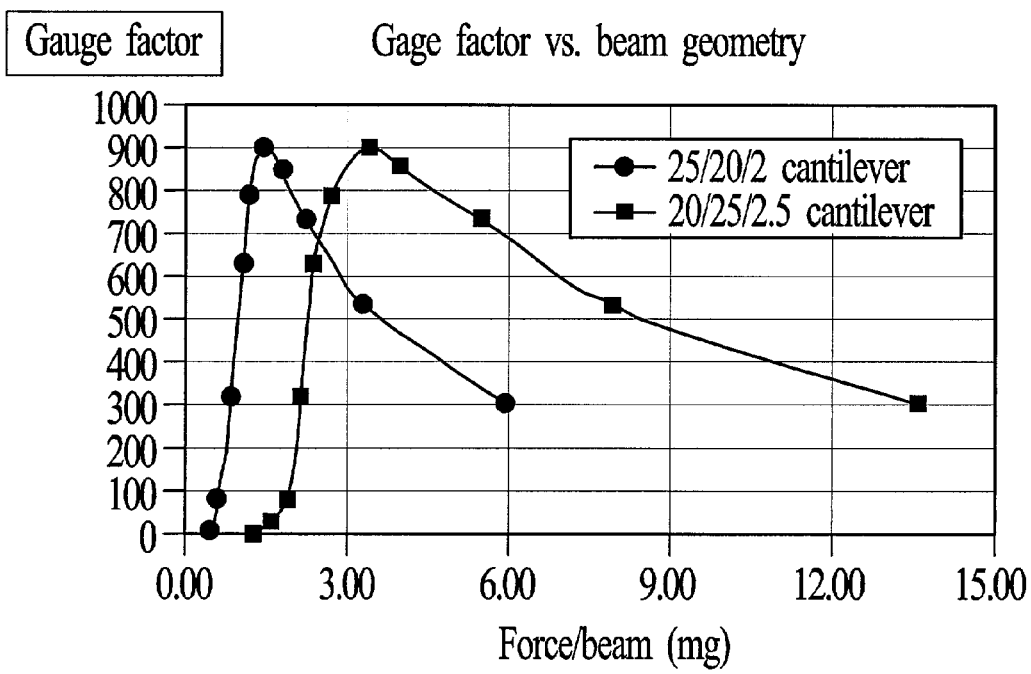
FIG. 9 shows the ability to tailor sensitivity of the device by means of stiffness change in the underlying beam substrate according to the present invention.

The sensor can be grown on a beam or membrane, whose mechanical properties determine the magnitude of the strain and thus the stress applied to the sensor. FIG. 9 shows how the gage factor curve can be tailored by the mechanical property of the beams, in this instance two cantilevers with different stiffness constants. Two cantilever substrates are used with different stiffness constants, causing the Gauge Factor curve of each to shift with respect to the applied stress. The stiffness of the cantilevers can be varied by changing their length, width and thickness.

Pressure Sensor Application of the TMR Sensor

Figure 10:
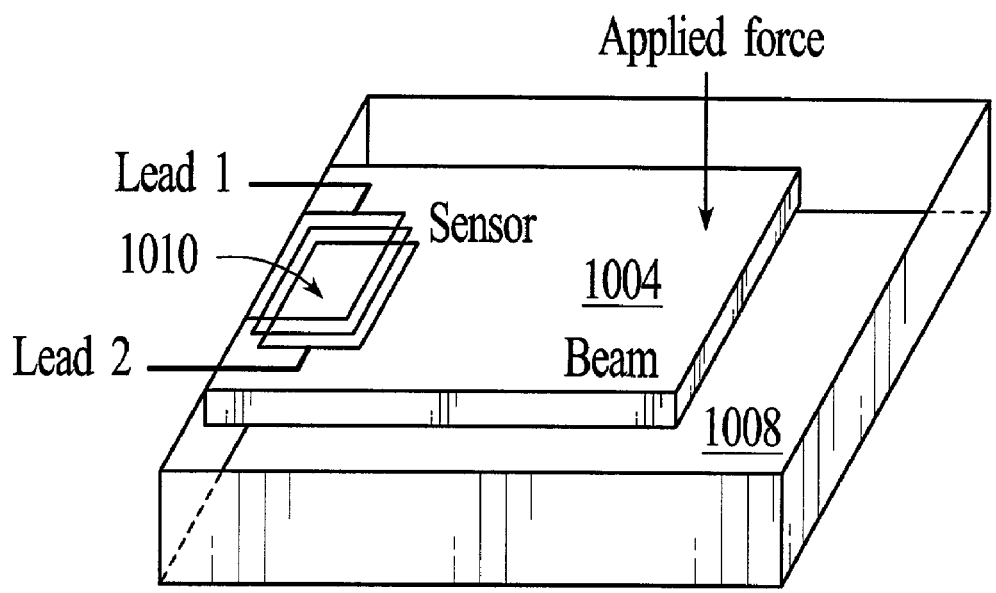
FIG. 10 illustrates a beam or diaphragm substrate on which a TMR sensor is deposited and patterned in accordance with the invention.

In accordance with an aspect of the invention, a multi-layer stack 1010 is the basis for a novel stress or pressure sensor, which can be used, for example, for fingerprint sensing. In order to use it, the underlying base structure for the TMR sensor 1010 is fabricated as a suspended bridge, a cantilevered beam 1004 or a similar kind of membrane that is supported over a cavity 1008 that is formed in a bulk substrate and allows for deformation of the cantilevered beam 1004, as shown in FIG. 10. An example of a method of fabricating this is described in more detail below. A TMR stack 1010 comprising the two ferromagnetic layers, the non-magnetic insulating spacer layer and the underlayer and capping layers are deposited on deformable beam 1004, and leads 1012 are connected thereto to apply a voltage across it and to measure the resulting spin-polarized tunneling current and resistance. It should be apparent that the support structure for TMR layer 1010 can be a variety of different structures other than the beam 1004 of this example, such as a sealed membrane over an enclosure, or any other form that may be suitable for detecting deflection and stress. An example would be where the TMR sensor is located under the beam, and thus subjected to compressive rather than tensile stresses.

Under the application of a force on the beam 1004, it deflects. Note that in this configuration of the beam, the stress direction needs to be either unidirectional or if bidirectional, needs to be different along the two principal axes. If the length of the beam is "L", the width "W", and the thickness "t", for a load "4Q" acting on a length L/4 at the end, the maximum tensile stress at the base of the beam where the sensor is located is approximately given by:

$$\sigma_{max}=Mt/2I=(7/16)QL^2t/I \qquad 6$$

where M is the bending moment, and I is the moment of inertia about the vertical axis.

The maximum stress and strain occur on the surface of the beam. Since the multi-layer stack 1010 is located on the surface of the beam 1004, and is a very thin set of films, for calculation and illustration purposes, one can assume that the TMR element is subjected to the maximum stress and strain.

Under these conditions, the multi-layer stack is subjected to the maximum tensile stress on the beam surface, as the beam bends in response to applied pressure. The magnetostriction of the device causes the resistance of the element to change depending on the sign of the applied stress, as described earlier. In this way, by measuring the resistance prior to and during the application of the stress, the difference in resistance gives a good indication of the magnitude of the stress. If the system is calibrated, this can give an idea of the absolute stress as well as just the presence of a pressure point.

In accordance with an aspect of the invention, the sensitivity of the device as described above exceeds the sensitivity of a capacitance-based sensor or a piezoresistive sensor. As a result, considerable miniaturization can be realized with TMR sensor 1010. With conventional fabrication methods, the TMR element can be made as small as 4 microns long and 3 microns wide while maintaining considerable sensitivity. It is desirable to make the beam as long as possible within the constraints of the product, because sensitivity only improves with the length of the beam.

In order to achieve the maximum sensitivity of the sensor to an applied stress, it is appropriate to choose an alloy and deposition conditions that would ensure a maximum ΔR/R response from the material, as well as a maximum magnetostriction coefficient.

Figure 11:
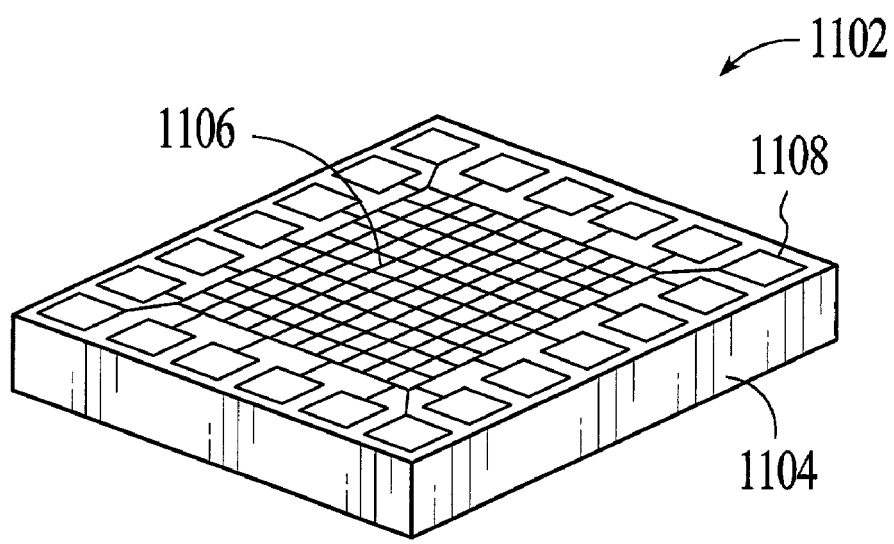
FIG. 11 illustrates a two dimensional array of beams or diaphragms employing TMR devices such as those illustrated in FIG. 4 and FIG. 5 for use as pressure sensors in accordance with the invention.

A tunneling magnetoresistive pressure sensor 1102 (that can be used for fingerprint verification/identification, for example) employing TMR sensors 1110 as described above will now be described in detail with reference to FIG. 11. Several sensors 1110 as described above are placed in an array 1106 of m rows by n columns on a substrate 1104, with a very fine pitch, and connected to electrodes 1108. Because the sensors can be made as small as 4 microns in length, the lateral resolution can easily satisfy requirements which are typically set for fingerprint applications, such as 500 dots per inch, as well as even more stringent requirements. For example, when a finger is placed on the array, the ridges on the fingers (which are spaced at about 400–500 microns, and are therefore considerably wider than the sensor pitch in the array), apply a force on the sensors that they come in contact with. The sensors that fall between the ridges experience little to no stress. In this way, one can generate a map of the contact points or the ridges on the fingerprint, and get an accurate reproduction of the fingerprint. However, in practice, the sensor length and pitch can be made greater than 5 microns, since such a good resolution is typically not required for a fingerprint image. Moreover, as the sensor pitch decreases, the processing time for the image increases, since the number of sensors in the image increases as well. The length of the multi-layer stack is typically in the range of 2–200 microns, and the width is in the range of 0.1–100 microns. For a fingerprint image capture application, the sensor dimensions are preferably 0.5–5 micron wide and 5–10 micron long.

Figure 12:
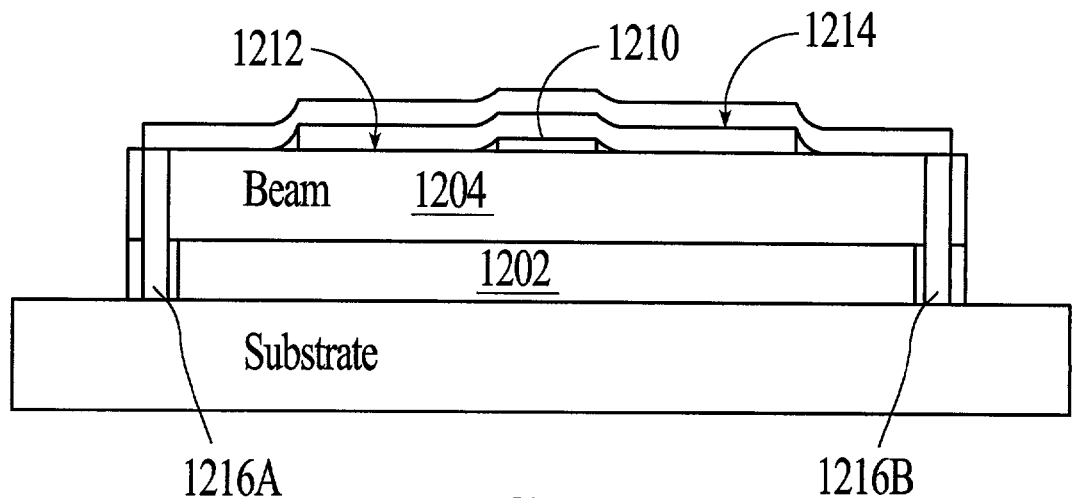
FIG. 12 illustrates the use of a conductive layer separated by an insulating spacer from the sensor on the beam, according to the present invention.

In order to protect the TMR sensor during its use as a fingerprint sensor, different schemes may be used. For ESD protection, FIG. 12 shows a fixed beam 1204 disposed over a cavity 1202, with TMR stack 1210 formed in this example on the center of the beam 1204. A layer of insulating material 1212 then coated on top of the GMR stack 1210, and then another layer 1214 of a conductive metal (such as Titanium, copper, etc.) is deposited, whose purpose is to bleed off transient charges caused by ESD and protect the sensor from ESD damage. This conductive film 1214 needs to be grounded, so that the charges from the transient voltage spikes can be bled to ground. This is illustrated in FIG. 12, with grounding leads 1216A and 1216B shown from the conductive layer in order to dissipate ESD charges to ground that is within the substrate. Another embodiment for ESD protection puts the sensor on the underside of the deflecting beam or membrane, such that the beam material and thickness act as a protective shield against ESD.

Secondly, to protect the TMR stack from mechanical abrasion or small impact, a hard coating can be deposited both above and below the conductive ESD protection layer. The thicknesses of all these layers would be in the range of 0.001 μm–10 μm. The material used for the mechanically protective coatings could be a material such as carbon based material, such as "diamond like carbon" or silicon carbide, for example. These materials can also be tailored to have surface energies such that undesired deposits, such as debris or oils from the finger, are prevented from adhering to the coating.

Figure 13:
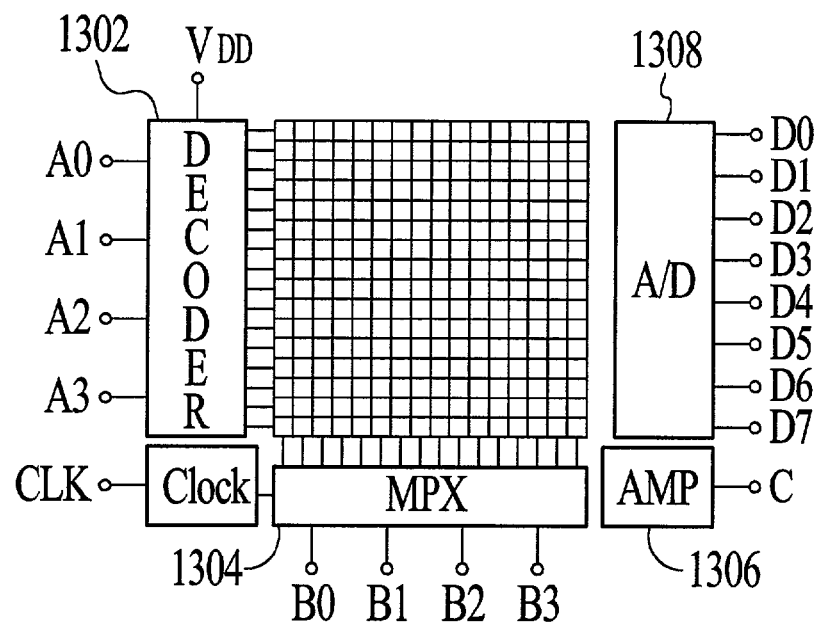
FIG. 13 illustrates an example of circuitry for performing electronic measurement in a two dimensional array of pressure sensors employing TMR sensor such as that illustrated in FIG. 10 in accordance with the invention.

An example of electronic circuitry and a method that can be used to probe an array of sensors either individually or as a group is shown in FIG. 13. It includes a decoder 1302, a multiplexer 1304, and amplifier 1306, and A/D converter 1308. The techniques for providing such electronic circuitry and method according to this example are well known and detailed descriptions thereof are not necessary for an understanding of the present invention. It is noted that there are several different methods of scanning and addressing the array. One approach is shown in FIG. 13, which employs transistors or diodes to isolate each element of the array during addressing of the array. An alternate cell addressing method is described in U.S. patent application Ser. No. 09/571,765, filed May 16, 2000 entitled "Method and Apparatus for Pressure Sensing", and does not require the use of transistors or diodes to address each element of the array.

In accordance with an aspect of a method of fingerprint identification/verification in accordance with the invention, a baseline is first established that determines whether there is a stress on a particular sensor with no finger on the sensor, wherein the "quiescent" resistance of each element of the array is measured. Then the readings are repeated with the finger on the sensor, and the difference in voltages/currents between the "quiescent, unstressed" state and the "stressed" state is calculated to determine the fingerprint pattern. The baseline can desirably be established either immediately prior to or immediately following the imaging of the fingerprint. While one method of scanning, providing power to each element, selectively addressing each element either using transistors or diodes, as shown in FIG. 13, or the cell addressing method described in U.S. patent application Ser. No. 09/571,765, filed May 16, 2000 entitled "Method and Apparatus for Pressure Sensing", conversion of values from analog to digital, etc are well known.

An advantage of the method of establishing a baseline in this invention is that it always establishes a reference value, which eliminates the effect of ambient temperature, humidity, stress, etc. The prior art, using capacitive or optical means are unable to obtain such a reference each time a measurement is taken, because they depend on the presence of a finger to obtain a reading each time. Even though the resistance of the sensor changes with temperature, this effect can be automatically compensated for by establishing a reference value, either immediately prior to or immediately following the fingerprint imaging, as noted above.

It should be apparent to those skilled in the art that since the TMR sensor's output depends on a number of factors, it can be used in a variety of alternative ways in this and other embodiments other than for fingerprint identification/verification.

Figure 14A:
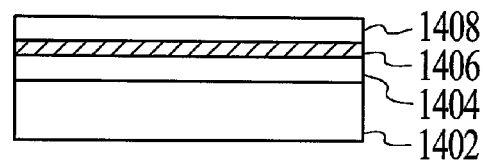
FIGS. 14A–E illustrate a method for fabricating a beam or diaphragm which would employ a TMR device such as that illustrated in FIG. 4 and FIG. 5 for the purpose of pressure sensing in accordance with the invention.
Figure 14B:
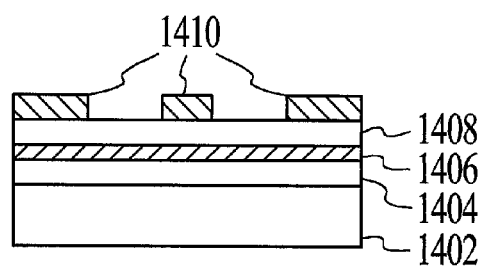
Figure 14C:
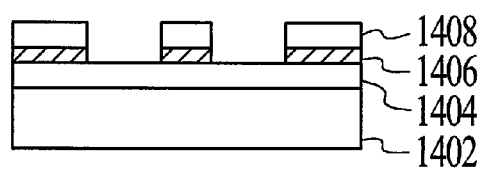
Figure 14D:
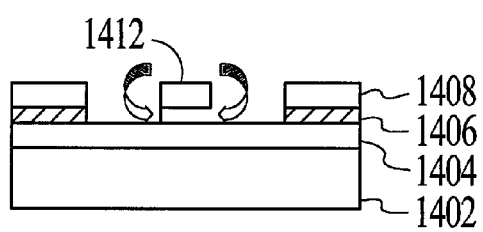

An example of a method for manufacturing a magnetoresistive sensor in accordance with the invention will now be described with reference to FIG. 14. As shown in FIG. 14A, a layer of silicon nitride 1404 is first deposited on a silicon substrate 1402, then a layer of polysilicon 1406, followed by another layer of silicon nitride 1408. Then the pattern of the beam is etched using photolithography by depositing a layer of photoresist 1410 as shown in FIG. 14B, and etching through at least the top two layers of silicon nitride and polysilicon as shown in FIG. 14C. This is followed by preferentially etching out the second layer of polysilicon underneath the silicon nitride in the beam portion 1412, thus forming a simply suspended beam 1412 of the upper layer of silicon nitride as shown in FIG. 14D.

Alternatively, using similar techniques as are known in the art, a thin silicon beam or membrane is made by starting from a silicon wafer using conventional processing means as have been described elsewhere in the literature. This is typically done either by etching from the back side using anisotropic etchants, or using single sided wafer processing, by first doping the wafer with n-type doping elements (arsenic), covering with a layer of epitaxial silicon, then etching using a chlorine gas plasma to preferentially etch the N+ region. The preferential etching of the N+ region under the top layer of epitaxial silicon leaves the upper layer suspended as a beam, supported on either side.

It should be noted that even though the manufacturing descriptions above are for the processing of silicon, one can use other materials to achieve the same purpose as well. For example, one could use a substrate of Aluminum, coat it with a layer of insulating alumina (using thin film deposition techniques that are well known), sputter another layer of metal (such as aluminum, titanium, copper, etc.). One can now perform photolithography and use dry etching techniques (such as ion milling) to etch down to the underlying layer of aluminum, and then use etchants that are selective to alumina to etch out the underlying alumina layer. In this way, a "bridge" structure of aluminum or other metal can be formed as well.

Figure 14E:
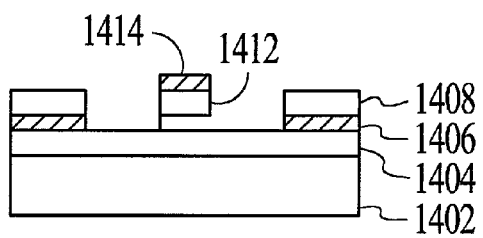

Once the beam is formed, a series of thin films is deposited using thin film techniques (typically a cluster tool), representing the magnetoresistive "stack". This series of materials comprises a tantalum layer (the underlayer), the free layer (or synthetic free layer stack SyFL), the barrier layer of aluminum oxide, the pinned layer (or synthetic pinned layer stack SyPL), the antiferromagnet layer, and finally the capping layer. This stack of thin films is deposited on the entire substrate, and therefore will cover the beam, and the exposed portions of the recess under the beam. Only the portions of the stack on top of the beam are the operative portions, hence a photolithographic process is used to either wet etch or dry etch out the portions of the stack that cover the rest of the substrate other than the portion 1414 on the beam 1412, as shown in FIG. 14E. Typically, the beam can be made anywhere from 0.2 micron to 20 microns thick; the length of the beam can range from 2 micron to several hundred microns, and the width of the beam can range from 2 micron to several microns. These parameters depend on the mechanical properties of the substrate material used to create the beam, and on the sensitivity required. The beam can be designed to either have "standoff" from the substrate, or can be a free standing structure, with the bottom of the substrate completely etched out.

Although the invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. A method of sensing pressure in which applied pressure causes a change in the magnetization vectors of ferromagnetic layers within the device and a corresponding change in resistance that can be sensed upon application of an externally supplied voltage comprising the steps of:

providing a sensing device with a sensor including plurality of layers, the plurality of layers comprising a non magnetic insulating barrier layer disposed between at least two ferromagnetic layers which are in an initial state such that their magnetization vectors are stable with respect to each other, and at least one of the ferromagnetic layers having non-zero magnetostriction; and sensing the resistance in the plurality of layers upon application of pressure while the externally supplied voltage is applied, the applied pressure causing the magnetization vector of at least one of the ferromagnetic layers to rotate from the initial state through the property of magnetostriction and thereby changing the resistance to a tunneling current produced by the applied voltage that flows in a direction orthogonal to a plane of the plurality of layers.

2. A method according to claim 1 wherein the initial state of the magnetization vectors that results in their being stable is one of parallel and antiparallel.

3. A method according to claim 1 wherein the initial state of the magnetization vectors that results in their being stable is parallel.

4. A method according to claim 1 wherein the sensing device includes a plurality of sensors that are formed in a two dimensional array and operate as the one sensor such that each sensor detects the pressure of an area associated with that sensor.

5. A method according to claim 1 further comprising the step of sensing an initial resistance of the device when the magnetizations of the ferromagnetic layers are in the initial state without the application of pressure.

6. A method according to claim 5 further comprising the step of determining the pressure applied to the sensing device, the step of determining using both the initial resistance and the sensed resistance in order to minimize the influence of external conditions on the determined pressure.

7. A method according to claim 6 wherein an external condition is liquid film applied over the device.

8. A method according to claim 6 wherein the sensing device includes a plurality of sensors that are each formed and operate as the one sensor such that each sensor detects the pressure of an area associated with that sensor.

9. A method according to claim 1 wherein one of the ferromagnetic layers is a free layer and one of the ferromagnetic layers is a pinned layer, the sign of magnetostriction in the ferromagnetic free layer being such that only compressive forces are sensed in the step of sensing.

10. A method according to claim 1 wherein one of the ferromagnetic layers is a free layer and one of the ferromagnetic layers is a pinned layer, the sign of the magnetostriction in the ferromagnetic free layer is such that only tensile forces are sensed in the step of sensing.

11. A method according to claim 1 wherein at least one of the ferromagnetic layers is comprised of a multilayer stack that includes a nonmagnetic spacer.

12. A method according to claim 11 wherein the nonmagnetic spacer is ruthenium.

13. A method according to claim 11 wherein one of the ferromagnetic layers is a free layer and one of the ferromagnetic layers is a pinned layer, wherein the free layer comprises the multilayer stack, and wherein a net magnetic moment of the free ferromagnetic layer is allowed to take on non-zero and zero values for the purpose of controlling a demagnetizing field of the multilayer stack.

14. A method according to claim 11 wherein one of the ferromagnetic layers is a free layer and one of the ferromagnetic layers is a pinned layer, and wherein the pinned layer comprises the multilayer stack.

15. A method according to claim 14 wherein a net magnetic moment of the pinned ferromagnetic layer is allowed to take on non-zero and zero values for the purpose of controlling a demagnetizing field of the multilayer stack.

16. A method according to claim 14 wherein the initial state of the magnetization vectors that results in their being stable is parallel.

17. A method according to claim 11 wherein the ferromagnetic layer that comprises the multilayer stack has a net non-zero magnetostriction.

18. A sensor apparatus that is capable of sensing an applied pressure using an externally supplied current comprising:

a sensing device with at least one sensor including a plurality of layers, the plurality of layers comprising a non magnetic insulating barrier layer disposed between two ferromagnetic layers, and at least one of the ferromagnetic layers having non-zero magnetostriction, wherein the applied pressure will cause a change in the magnetization vector of the at least one ferromagnetic layer having non-zero magnetostriction, which can be sensed as a change in resistance to a tunneling current that develops in a direction orthogonal to a plane of the plurality of layers upon the application of the externally supplied voltage also applied in the direction orthogonal to the plane of the layers.

19. An apparatus according to claim 18 wherein the ferromagnetic layers include NiFe, CoFe or Co.

20. An apparatus according to claim 19 wherein the thickness of each ferromagnetic layer is within the range of 0.1–50 nm.

21. An apparatus according to claim 20 wherein the thickness of the non-magnetic insulating barrier layer is within the range of 0.1 to 10 nm.

22. An apparatus according to claim 18 wherein the sensor further includes a buffer layer disposed below a lower of the two ferromagnetic layers to assist in uniform epitaxial growth of the lower ferromagnetic layer, and increased TMR response.

23. An apparatus according to claim 22 further including a capping layer disposed above an upper of the two ferromagnetic layers to assist in preventing oxidation during subsequent processing of the sensor.

24. Apparatus according to claim 23 where the capping layer is Tantalum.

25. An apparatus according to claim 18 further including a capping layer disposed above an upper of the two ferromagnetic layers to assist in preventing oxidation during subsequent processing of the sensor.

26. Apparatus according to claim 25 where the capping layer is Tantalum.

27. An apparatus according to claim 18 further including an interlayer disposed between at least one of the ferromagnetic layers and the nonmagnetic insulating barrier spacer, the interlayer provided to increase TMR response and reduce interdiffusion.

28. An apparatus according to claim 27 wherein the interlayer is comprised of one of Co and CoFe.

29. An apparatus according to claim 18 further including an interlayer disposed between each ferromagnetic layer and the nonmagnetic insulating spacer, each interlayer provided to increase TMR response and reduce interdiffusion.

30. An apparatus according to claim 29 wherein each interlayer is comprised of one of Co and CoFe.

31. An apparatus according to claim 18 wherein at least one of the ferromagnetic layers is comprised of a multilayer stack in which a plurality of layers in the multi-layer stack are antiferromagnetically coupled to each other.

32. An apparatus according to claim 18 wherein the sensing device includes a plurality of sensors arranged in an array, each sensor being formed and operating as at least one sensor such that each sensor detects the pressure of an area associated with that sensor.

33. An apparatus according to claim 32 wherein each sensor further includes a buffer layer disposed below a lower of the two ferromagnetic layers to assist in uniform epitaxial growth of the lower ferromagnetic layer, and increased TMR response.

34. An apparatus according to claim 33 wherein each sensor further includes a capping layer disposed above an upper of the two ferromagnetic layers to assist in preventing oxidation during subsequent processing of the sensor.

35. An apparatus according to claim 34 wherein each sensor further includes an interlayer disposed between at least one of the ferromagnetic layers and the nonmagnetic insulating spacer, the interlayer provided to increase TMR response and reduce interdiffusion.

36. An apparatus according to claim 34 wherein each sensor further includes an interlayer disposed between each ferromagnetic layer and the nonmagnetic insulating spacer, each interlayer provided to increase TMR response and reduce interdiffusion.

37. An apparatus according to claim 32 wherein at least one of the ferromagnetic layers is comprised of a multilayer stack in which a plurality of layers in the multi-layer stack are antiferromagnetically coupled to each other.

38. An apparatus according to claim 18 further including a protective coating layer disposed above the an upper of the ferromagnetic layers, said protective coating layer having a surface energy that reduces deposits from adhering thereto.

39. An apparatus according to claim 38 wherein the protective coating layer is a carbon based material.

40. An apparatus according to claim 39 wherein the carbon based material is silicon carbide.

41. An apparatus according to claim 18 further including an insulating layer disposed over an upper of the ferromagnetic layers and a conductive layer disposed over the insulating layer such that the conductive layer provides for protection from electrostatic discharge.

42. An apparatus according to claim 18 wherein one of the ferromagnetic layers is a free layer and one of the ferromagnetic layers is a pinned layer, wherein the pinned ferromagnetic layer is pinned by an antiferromagnetic layer.

43. An apparatus according to claim 42 wherein the antiferromagnetic layer is CrMnPd.

44. An apparatus according to claim 42 wherein the sign of magnetostriction in the ferromagnetic free layer being such that only compressive forces are sensed in the step of sensing.

45. A method according to claim 42, wherein the sign of the magnetostriction in the ferromagnetic free layer is such that only tensile forces are sensed in the step of sensing.

46. An apparatus according to claim 18 wherein at least one of the ferromagnetic layers is comprised of a multilayer stack that includes a nonmagnetic spacer.

47. An apparatus according to claim 46 wherein the nonmagnetic spacer is ruthenium.

48. An apparatus according to claim 46 wherein one of the ferromagnetic layers is a free layer and one of the ferromagnetic layers is a pinned layer, wherein the free layer comprises the multilayer stack, and wherein a net magnetic moment of the free ferromagnetic layer is allowed to take on non-zero and zero values for the purpose of controlling a demagnetizing field of the multilayer stack.

49. An apparatus according to claim 46 wherein one of the ferromagnetic layers is a free layer and one of the ferromagnetic layers is a pinned layer, and wherein the pinned layer comprises the multilayer stack.

50. An apparatus according to claim 49 wherein a net magnetic moment of the pinned ferromagnetic layer is allowed to take on non-zero and zero values for the purpose of controlling a demagnetizing field of the multilayer stack.

51. An apparatus according to claim 46 wherein the ferromagnetic layer that comprises the multilayer stack has a net non-zero magnetostriction.

52. An apparatus according to claim 18 wherein the ferromagnetic layers have non-zero magnetostriction.

53. A method of sensing pressure using an externally supplied voltage in which applied pressure causes a change in the magnetization vectors of ferromagnetic layers within the device and a corresponding change in resistance comprising the steps of:
providing a sensing device with a sensor including plurality of layers, the plurality of layers comprising a non magnetic insulating layer disposed between the free ferromagnetic layer and a pinned ferromagnetic layer, and an anti-ferromagnetic layer disposed over the pinned ferromagnetic layer, the non magnetic insulating layer providing ferromagnetic coupling of the free and the pinned ferromagnetic layers in an initial state such that magnetization vectors of the free and pinned ferromagnetic layers are substantially parallel to each other; and
sensing the resistance in the plurality of layers upon application of pressure while the externally supplied voltage is being applied in a direction orthogonal to a plane of the layers, the applied pressure causing the magnetization vector of the free ferromagnetic layer to change from the initial state, and thereby result in a change in resistance to a tunneling current produced by the applied voltage and that flows orthogonal to the plane of the plurality of layers.

54. A method according to claim 53 wherein the sensing device includes a plurality of sensors that are formed in a two dimensional array and operate as the one sensor such that each sensor detects the pressure of an area associated with that sensor.

55. A method according to claim 53 wherein the sensing device includes a plurality of sensors that are formed in a two dimensional array and operate as the one sensor such that each sensor detects the pressure of an area associated with that sensor.

56. A method according to claim 53 further comprising the step of sensing a reference resistance of the device when the ferromagnetic layers are in the initial state without the application of pressure.

57. A method according to claim 56 wherein the step of sensing the reference resistance is sensed either immediately prior to or immediately following the sensing of applied pressure.

58. A method according to claim 56 further comprising the step of determining the pressure applied to the sensing device, the step of determining using both the reference resistance and the sensed resistance in order to minimize the influence of external conditions on the determined pressure.

59. A method according to claim 58 wherein an external condition is a liquid film applied over the device.

60. A method according to claim 58 wherein the sensing device includes a plurality of sensors that are each formed and operate as the one sensor such that each sensor detects the pressure of an area associated with that sensor.

61. A method according to claim 60 wherein the method senses pressure applied during the obtaining of a fingerprint and further includes the step of using the resistance sensed by each sensor to determine the fingerprint.

62. A method according to claim 53 wherein compressive forces are sensed in the step of sensing.

63. A method according to claim 53 wherein tensile forces are sensed in the step of sensing.

64. A method according to claim 53 wherein both of the ferromagnetic layers have non-zero magnetostriction.

65. An apparatus for sensing applied pressure upon application of an externally supplied voltage comprising:
a sensor including:
an antiferromagnetic pinning layer;
a pinned ferromagnetic layer that is pinned by the antiferromagnetic layer;
a free ferromagnetic layer with non-zero magnetostriction; and
a non magnetic insulating barrier layer disposed between the free and pinned ferromagnetic layers, wherein, in an initial state, a net magnetization vector of each of the free and pinned ferromagnetic layers are stable with respect to each other, and wherein applied pressure causes a change in the magnetization vector of one the free ferromagnetic layer through the property of magnetostriction and a corresponding change in resistance, such that the resistance can then be sensed by application of the externally supplied voltage in a direction orthogonal to the plane of the plurality of the layers.

66. An apparatus according to claim 65 wherein, in the initial state, the net magnetization vector of each of the free and pinned ferromagnetic layers are parallel.

67. An apparatus according to claim 65 further including a plurality of sensors, each that are formed in a two dimensional array and operate as the sensor such that each sensor detects the pressure of an area associated with that sensor.

68. An apparatus according to claim 65 wherein the fixed and pinned ferromagnetic layers are comprised substantially of NiFe or CoFe or Co, either alone or in combination.

69. An apparatus according to claim 65 wherein the thickness of each ferromagnetic layer is within the range of 0.5–50 nm.

70. An apparatus according to claim 69 wherein the thickness of the non-magnetic insulating layer is within the range of 0.1 to 10 nm.

71. An apparatus according to claim 65 wherein the sensor further includes a buffer layer disposed below a lower one of the pinned and fixed ferromagnetic layers to assist in uniform epitaxial growth of the first ferromagnetic layer, and increased TMR response.

72. An apparatus according to claim 71 further including a capping layer disposed above the second ferromagnetic layer.

73. An apparatus according to claim 65 further including a capping layer disposed above an upper one of the pinned and fixed ferromagnetic layers.

74. An apparatus according to claim 65 further including an interlayer disposed between at least one of the pinned and fixed ferromagnetic layers and the nonmagnetic conducting spacer, the interlayer provided to increase TMR response and reduce interdiffusion.

75. An apparatus according to claim 74 wherein the interlayer is comprised of one of Co and CoFe.

76. An apparatus according to claim 65 further including an interlayer disposed between each of the pinned and fixed ferromagnetic layers and the nonmagnetic insulating spacer, each interlayer provided to increase TMR response and reduce interdiffusion.

77. An apparatus according to claim 76 wherein each interlayer is comprised of one of Co and CoFe.

78. An apparatus according to claim 65 wherein one or both of the pinned and fixed ferromagnetic layers is a laminate of a plurality of layers that form a multilayer stack and are antiferromagnetically coupled to each other.

79. An apparatus according to claim 78 wherein the free layer comprises the multilayer stack, and wherein a net magnetic moment of the free ferromagnetic layer is allowed to take on non-zero and zero values for the purpose of controlling a demagnetizing field of the multilayer stack.

80. An apparatus according to claim 78 wherein a net magnetic moment of the pinned ferromagnetic layer is allowed to take on non-zero and zero values for the purpose of controlling a demagnetizing field of the multilayer stack.

81. A method according to claim 78 wherein the ferromagnetic layer that comprises the multilayer stack has a net non-zero magnetostriction.

82. An apparatus according to claim 65 further including a protective coating layer disposed above an upper of the pinned and fixed ferromagnetic layers, said protective coating layer having a surface energy that reduces deposits from adhering thereto.

83. An apparatus according to claim 82 wherein the protective coating layer is a carbon based material.

84. An apparatus according to claim 83 wherein the carbon based material is silicon carbide.

85. An apparatus according to claim 65 further including an insulating layer disposed over the upper of the pinned and fixed ferromagnetic layers and a conductive layer disposed over the insulating layer such that the conductive layer provides for protection from electrostatic discharge.

* * * * *